May 1, 1951    J. A. BALL ET AL    2,551,086
MULTICOLOR MOTION-PICTURE FILM WITH SOUND RECORD
Filed Dec. 11, 1945

Fig. 1.

- 5 — SILVER HALIDE & 4,4'METHYLENE-BIS[3-METHYL-1-(M-STEAROYLAMINO-PHENYL)-5-PYRAZOLONE]
- 4 — GELATIN & TARTRAZINE
- 3 — SILVER HALIDE & DIBENZOYLACET BENZIDINE
- 1 — TRANSPARENT FILM BASE
- — GELATIN-COMMINUTED SILVER
- 2 — SILVER HALIDE & OXYNAPHTHOIC ACID-P-DODECYL ANILIDE

Fig. 2.

- 9 — SILVER HALIDE & 4,4'METHYLENE-BIS[3-METHYL-1-(M-STEAROYLAMINO-PHENYL)-5-PYRAZOLONE]
- 8 — GELATIN & TARTRAZINE
- — SILVER HALIDE & 4,4'-BIS(1-NAPHTHOL-2-SULFONAMIDO PHENYL) ETHER
- 7 — SILVER HALIDE & DIBENZOYLACET BENZIDINE
- 6 — GELATIN SUBLAYER
- — CELLULOSE ACETATE

INVENTORS
JOSEPH ARTHUR BALL,
ANDREW BRADSHAW JENNINGS &
OTIS WILLARD MURRAY
BY Lynn Barratt Morris
ATTORNEY Patented May 1, 1951

2,551,086

UNITED STATES PATENT OFFICE 2,551,086

MULTICOLOR MOTION-PICTURE FILM WITH SOUND RECORD

Joseph Arthur Ball, Los Angeles, Calif., and Andrew Bradshaw Jennings, New Brunswick, and Otis Willard Murray, Fords, N. J., assignors to E. I. du Pont de Nemours & Company, Wilmington, Del., a corporation of Delaware Application December 11, 1945, Serial No. 634,255

1 Claim. (Cl. 95—2)

This invention relates to new photographic positive developed film elements for color and sound reproduction and to processes for making the same. More particularly it relates to developed positive multilayer motion picture elements for color and sound reproduction which are free from silver and silver salt images and to processes of producing the same.

An object of this invention is to provide the art with improved positive multicolor motion picture films for color and sound reproduction. A further object is to provide such films which are free from silver images and contain dye images only. A still further object is to provide such films which can be used with photoelectric tubes which when activated by incandescent tungsten light sources have their peaks of sensitivity near the middle of the visible region of the spectrum. A still further object is to provide such films which contain the most effective dye sound image record in the outer contiguous stratum. Still other objects will be apparent from the following description of the invention.

The novel multilayer motion picture positive multicolor films of this invention contain a composite multicolor picture in the layers thereof and a composite dye sound image in two of the layers. The dye images in the respective layers are of the same subtractive color. The dye images in the sound track are in the two outermost image bearing layers. In the case of three-color films wherein all layers are on one side, the dye images in the outermost image layer preferably should be of that color which produces the strongest signal in a photoelectric tube which has its peak of response in the visible region of the spectrum. The next dye image layer should be of that color which produces the next greatest signal.

In the case of three-color films which have two layers on one side of a transparent base and one on the other, the dye sound image records should be in the said two layers. The films when used are placed in a projector so that the most signal-effective layer is optically most distant from the tube.

In a preferred aspect of the invention the outermost layer contains a minus green or magenta dye image in the picture and sound record areas. A cyan dye image is contained in the next image-bearing layer which may be contiguous or separated by a filter layer from the magenta layer in both picture and sound track areas. A yellow dye image record is then in the innermost layer or on other side of the base. The dye sound image record is blue in color.

In another aspect of the invention the yellow and cyan images may be reversed. In this case the composite dye sound image record is red in color.

The films just described have the advantage that the dye sound image record is not present throughout all three layers of the film as is the composite dye image in the picture. By confining the sound image record to the outer layers, the sound track more faithfully reproduces the sound without distortion.

By placing the dye sound image record in two layers of a multilayer film it is possible to absorb the greatest amount of activating light consistent with good definition which falls upon the sound track. Even though the sound track is in dye images and free from silver or silver salt images, one can obtain an effective density to selected tubes or cells comparable with that of corresponding normal silver tracks to the conventional cell.

The invention will be further illustrated but is not intended to be limited by the following examples.

Example I

A cellulose acetate film base was provided with a thin gelatin layer on each side thereof forming a transparent film base as shown in Fig. 1 of the drawing. One one side of this film base there was coated a gelatin dispersion of comminuted silver to form layer 1. A gelatino-silver iodobromide emulsion containing ten grams of oxynaphthoic acid para-dodecylanilide/kg. of emulsion was coated onto the latter layer to a weight of about 70 mg./sq. dec. to form color-yielding layer 2. On the other side of the base there was coated a gelatino-silver iodobromide emulsion containing ten grams of dibenzoylacet-benzidine and 20 mg. of 1,1'-diethyl-2,4'-carbocyanine iodide per kg. of emulsion to a coating weight of 70 mg./sq. dec. forming color-yielding layer 3. On the latter layer there was then coated a gelatin dispersion containing tartrazine (Color Index 640) forming filter layer 4. On the latter layer there was then coated a gelatino-silver iodobromide emulsion containing ten grams of 4,4'-methylene- bis -[3-methyl-1-(m-stearoyl-aminophenyl)-5-pyrazolone] per kg. of emulsion to a coating weight of 70 mg./sq. dec. forming color-yielding layer 5.

A sound negative is printed with light of spectral composition adjusted to yield proper distribution of printing in layers 5 and 3 respectively. The picture negatives are printed into the picture area of the same layers at the same time. The red record of said negative is printed into layer 2 by either white or blue light, the blue record is printed into layer 3 with red light, and the green record is printed into layer 5 with blue light. After exposure of each of the layers, the element is simultaneously developed in an aqueous solution made by admixing the following ingredients:

| | Grams |
|---|---|
| Diethylparaphenylenediamine.HCl | 3.0 |
| Sodium carbonate (anhydrous) | 30.0 |
| Sodium sulfite (anhydrous) | 10.0 |
| Potassium bromide | 1.5 |
| Water to 1 liter | |

The development was continued for a period of ten minutes whereby a multicolor picture and sound record was formed in the respective layers. The film was thoroughly washed and then bleached in slightly alkaline 4% potassium ferricyanide, followed by fixing in 20% ammonium thiosulfate. After bleaching and fixing, the film contained a multicolor picture in the picture area and a red dye sound image record. This red track consisted of a magenta dye sound image record in layer 5 and a yellow dye sound image record in layer 3. The film element when used in the processes described and apparatus mentioned above and described more fully in an application Serial Number 634,254, filed December 11, 1945, now abandoned, resulted in an excellent quality of sound reproduction.

*Example II*

A cellulose acetate film was provided with a thin gelatin substratum forming a transparent support as shown in Fig. 2 of the drawing. On the gelatin sublayer there was coated a red-sensitive gelatino-silver iodobromide emulsion containing ten grams of dibenzoylacetbenzidine and 3,3'-diethylthiodicarbocyanide iodide per kg. of emulsion to form layer 6. On this layer was coated an ortho gelatin silver iodobromide emulsion containing 1,1'-diethyl-2,2'-cyanine iodide and ten grams of 4,4'-bis-(1-napthtol-2-sulfonamido phenyl) ether per kg. of emulsion forming color-yielding layer 7. On such layer was then coated a gelatin dispersion containing tartrazine to form yellow filter layer 8. A gelatino-silver iodobromide emulsion containing ten grams of 4,4'-methylene-bis-[3-methyl-1-(m-stearoylaminophenyl) methylpyrazolone] per kg. of emulsion was coated on layer 8 to form color-yielding layer 9. Each of the above silver halide layers had a coating weight of about 70 mg./sq. dec.

A picture and sound motion picture negative was printed onto the element described in the previous paragraph as follows: The sound track was printed into layers 9 and 7 with blue-green light. The picture records were then printed as follows: The blue record was printed into layer 6 with red light, the red layer into layer 7 with green light, and the green record into layer 9 with blue light. The picture and sound records were then simultaneously developed, bleached, and fixed after the manner described under Example I to yield a composite color, sound and picture record. This film, when used in the novel combination described above, resulted in sound reproduction of high quality.

The invention is not limited to the preparation of films for any one type of sound track. Thus film elements containing dye sound image records or sound track of the variable area type or variable density type can be made with equal facility. For the variable area type negatives containing sound tracks of normal contrast and density can be employed to print the novel positive films of this invention containing a three-color picture in three layers of a film and a composite two-color dye sound image record in two outer layers of the film.

The light-sensitive layers of the film elements are not limited to any particular types. On the contrary, the invention is applicable to many and diverse types. Thus they may be composed of gelatin or other hydrophilic natural or synthetic colloids, e. g., cellulose derivatives, e. g., substantially hydrolyzed cellulose esters, such as cellulose acetate, modified or hardened polyvinyl alcohol, polyvinyl acetals, etc., and contain immobile color formers and silver halides. Alternatively the light-sensitive layers may be composed of silver halide dispersions in hydrophilic hydroxylated color former polymers as described in United States application Serial No. 528,945 filed March 31, 1944, now United States Patent 2,397,866.

An advantage of this invention resides in the fact that sound tracks of satisfactory quality can be made by a simplified procedure. The process enables one to color develop and fix the picture areas and sound track areas simultaneously. It renders printing of the sound records more facile and gives a better record for reproduction. It also eliminates the necessity for edge treating films.

As many widely different embodiments of this invention can be made without departing from the spirit and scope thereof, it is to be understood that the invention is not to be limited except as defined by the claim.

What is claimed is:

A positive three-color multilayer motion picture film having a composite multicolor picture in three image-bearing layers which are disposed on one side of a transparent film base, the outermost layer containing a magenta azomethine dye image of 4,4'-methylene-bis-[3-methyl-1-(m-stearoylaminophenyl)-5-pyrazolone], the central layer being an indophenol dye image of 4,4'-bis(1-naphthol-2-sulfonamidophenyl) ether and the innermost layer containing an azomethine dye image of dibenzoylacetbenzidine, all coupled with the oxidation product of p-N-diethylaminoaniline and a composite dye sound image record in two adjacent outer layers only thereof of the same dye as in the picture areas of the respective layers, the dye sound image in the outermost layer absorbing the preponderant amount of light within the region of 4800 to 6000 Å. and having the same spectral absorption as the picture component image in the same layer, said film having a gelatin layer between the two outermost image bearing layers.

JOSEPH ARTHUR BALL.
ANDREW BRADSHAW JENNINGS.
OTIS WILLARD MURRAY.

REFERENCES CITED

The following references are of record in the file of this patent:

UNITED STATES PATENTS

| Number | Name | Date |
|---|---|---|
| 2,009,689 | Crespinel | July 30, 1935 |
| 2,062,304 | Gaspar | Dec. 1, 1936 |
| 2,113,329 | Mannes et al. | Apr. 5, 1938 |
| 2,176,303 | Jones | Oct. 17, 1939 |
| 2,183,393 | Gaspar | Dec. 12, 1939 |
| 2,231,685 | Seymour | Feb. 11, 1941 |

FOREIGN PATENTS

| Number | Country | Date |
|---|---|---|
| 375,338 | Great Britain | June 24, 1932 |
| 486,517 | Great Britain | June 3, 1938 |
| 503,940 | Great Britain | Apr. 11, 1939 |